United States Patent [19]
Linn

[11] Patent Number: 5,755,337
[45] Date of Patent: May 26, 1998

[54] RECORD KEEPING HOLDER FOR FOOD STORAGE RETRIEVAL

[76] Inventor: Maynard W. Linn, 6336 N. Bergeron Ave., Fresno, Calif. 93704

[21] Appl. No.: 658,168

[22] Filed: Jun. 4, 1996

[51] Int. Cl.⁶ .................................................. A47F 7/00
[52] U.S. Cl. .................... 211/13.1; 211/50; 211/69.1; 211/DIG. 1; 206/214; 248/206.5
[58] Field of Search .................... 211/13.1, 50, 69.1, 211/DIG. 1; 248/206.5; 206/214, 215, 555, 425

[56] References Cited

U.S. PATENT DOCUMENTS

| | | | |
|---|---|---|---|
| 4,592,486 | 6/1986 | Belokin | 248/206.5 X |
| 4,616,755 | 10/1986 | Adolfsson | 211/50 X |
| 4,736,853 | 4/1988 | O'Mara | 248/206.5 X |
| 4,919,276 | 4/1990 | Kim et al. | 211/69.1 X |
| 4,941,576 | 7/1990 | Sugarman et al. | 211/13.1 |
| 4,964,519 | 10/1990 | Sugarman et al. | 211/50 |
| 5,460,305 | 10/1995 | Ahearn | 248/206.5 X |
| 5,601,193 | 2/1997 | Santoya | 211/13.1 X |
| 5,607,067 | 3/1997 | Morrissey | 248/206.5 X |

*Primary Examiner*—Robert W. Gibson, Jr.
*Attorney, Agent, or Firm*—Richard A. Ryan

[57] ABSTRACT

A record keeping holder having a C-shaped or U-shaped bracket for removably holding a tape marker flag dispenser containing multiple tape flags of various colors and a writing surface suitable for recording information pertaining to food items placed in a food storage unit, such as a refrigerator or freezer. The holder is provided with a color coded bar adjacent to the writing surface having color indicators that correspond to the tape flag colors and a writing instrument holder adapted for removably holding a writing instrument. In use, a single tape flag is placed on a food storage container to designate, in conjunction with the writing surface, what food item is contained therein. Later retrieval of the food item is facilitated by the sighting of the tape flag corresponding to the color indicator adjacent to the description previously recorded on the writing surface. The holder is adaptable for being removably attached to a vertical metallic or non-metallic surface such as a refrigerator or freezer door, making the record keeping holder readily visible and accessible to persons seeking to store or retrieve food, such as leftovers or pre-prepared meals, from the refrigerator or freezer. Several alternative embodiments are available including the use of an erasable surface, a card holder with pre-printed or blank cards, a dispenser cover to match kitchen decor, a holder that utilizes the dispenser packaging and a single piece record keeping holder.

10 Claims, 6 Drawing Sheets

RECORD KEEPING HOLDER FOR FOOD STORAGE RETRIEVAL

BACKGROUND OF THE INVENTION

The field of the present invention relates generally to record keeping holders having writing articles such as paper pads, pencils, pens, etc. More specifically, this invention relates to record keeping holders for use in marking by color tagging and thereby identifying food items placed into a refrigerator or freezer for later retrieval. Even more specifically, this invention is directed to a record keeping holder having tape flags, or the like, and a writing surface in combination with a color code device to identify left-over and pre-prepared meals to prevent spoilage, resulting in food being discarded, by keeping a record of the left-over and pre-prepared meals visually accessible to the family.

It is known that many people place food items into food storage units, such as refrigerators and freezers, for later retrieval. These food items often result from partially eaten meals that a person desires to save for later consumption, i.e., leftovers. Additionally, in this day of conflicting priorities, the primary meal preparer often knows that there will be times when he or she will be unavailable or there will be insufficient time to prepare a full course meal when the family or members thereof are available to sit down for a meal. In this latter circumstance, the food preparer will often prepare all or part of a meal in advance and place the food items in the refrigerator or freezer for later retrieval and final preparation by the food preparer or other members of the family. Often food items are placed in packages or containers, such as aluminum foil, plastic bowls, or the like, that do not readily allow viewing the contents thereof. In addition, these packages or containers are often not suitable to multiple use marking for identification of the food item and indexing of when the food item was placed in the food storage unit. Typically, such marking consists of writing directly on the package or container or attaching a label with a written description on the package or container. Both methods suffer from aesthetic and functional deficiencies, including smearing, adhesives that fail to hold, and adhesives that make removal of the label very difficult.

It is also known that tape flags, such as POST-IT (3M Corporation ™) tape flags are commonly used to mark items in books, papers and the like. Tape flags are generally made from a flexible material comprised of an adhesive tape portion having adhesive substance on one side and a marker portion that is colored and attached to the adhesive tape portion at one end. It is generally known to place the adhesive tape portion of a tape flag on a page such that the marker portion remains visible and the page can be easily found for later reference.

Tape flags are generally packaged and sold in plastic dispensers containing one or more tape flags. One such tape flag dispenser, marketed by the 3M Commercial Office Supply Division of St. Paul, Minn., contains five "Smaller Size" tape flags of various contrasting colors (i.e., red, blue, yellow, orange and green). The dispenser itself is generally comprised of a large rectangular base having a body unit of reduced width and length. The body unit contains an upwardly extending open ended tubular neck portion of elongated cross sectional length extending above and along the center of the body unit. The five colored tape flags of different colors extend from the neck portion of the body unit in a substantially parallel fashion. The bottom of the dispenser is attached to a cardboard portion that is integrally attached to a display card.

The tape flag dispenser described above allows the user to remove individual flags from the body unit for placement on suitable articles. The flags are removed from the dispenser in a sequential fashion such that as one flag is removed another flag of the same color is pulled out of the body unit of the dispenser and placed in a dispensing position wherein the marker portion is slightly extended from the dispensing unit for easy removal. In general use, the display card is separated from the cardboard portion attached to the tape flag dispenser.

Receptacles for holding writing utensils and accessories such as pencils, pens, note pads, or the like are known to exist. For example, U.S. Pat. Nos. 4,941,576 and 4,964,519, both of Sugarman, et al., disclose devices that are suitable for holding a tape flag dispenser and a writing pad. The former patent also discloses the use of a writing utensil in combination with a tape flag dispenser and writing pad, wherein the device is also suitable for receiving various other accessories, such as a time keeping unit. The above-mentioned patents contains some features common to many article holders. However, the inventions disclosed in the Sugarman patents and other known holders are not designed to utilize the tape flags and writing pad in functional combination with each other, but instead are generally intended to provide a device that holds separate, non-integral utilities. Specifically, none of the holders known to exist is suitable or utilized for food storage and retrieval and none of these devices utilize a coding device, such as a color coded member, in conjunction with a multi-flag tape flag dispenser and writing pad for marking and identifying food products placed into a food storage unit.

SUMMARY OF THE INVENTION

The problems with the storage of leftovers and pre-prepared meals outlined above are solved by the record keeping holder in accordance with the present invention. That is to say, the present invention provides for a holder that is visually accessible to family members and convenient to record the identify of and date when food items are placed into a food storage unit.

The record keeping holder of the instant invention can be constructed of a light weight material such as plastic or the like, although materials such as metal and wood are suitable also. The holder comprises a base having a substantially C-shaped or U-shaped bracket attached to or formed integrally therewith suitable for receiving a tape flag dispenser. A writing surface and a color coded bar are provided for recording the marked food product package or container. Attached to the base is a writing instrument holder formed to removably hold a pen or other writing instrument. A supply of tape flags extend outwardly from the tape flag dispenser. The writing surface can be a note pad, an erasable surface such as a chalk board or such as a melamine surface that is attached to the base, or the like. The base can be adapted for retaining the record keeping holder in a substantially vertical position on a metallic or non-metallic surface.

The record keeping holder of the present invention provides an easy and convenient way of keeping track of what food items are in various packages or containers and when those food items where placed in the refrigerator, freezer or other food storage unit. In use, a tape flag is placed on the food item package or container to be stored in the refrigerator or freezer and then a description of the food item is recorded on the holder's writing surface adjacent to a the color on the color coded bar that corresponds to the color of the tape flag placed on the food item package or container. Family members can then observe what designated foods are in the refrigerator or freezer and each pertinent food item can be easily found by looking for the corresponding colored tape flag on the food item package or container.

Accordingly, the primary objective of the present invention is to provide an inexpensive yet effective record keeping holder that is receivable on a metallic or non-metallic surface and is particularly adapted for identifying information concerning food items placed in a food storage unit.

Another objective of the present invention is to provide an record keeping holder that comprises a base having a C-shaped or U-shaped bracket integral therewith or attached thereto, writing surface, color bar member and writing instrument holder, wherein the bracket is adapted for receiving and containing a tape flag dispenser.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

DETAILED DESCRIPTION OF PREFERRED EMBODIMENTS

Figure 1:
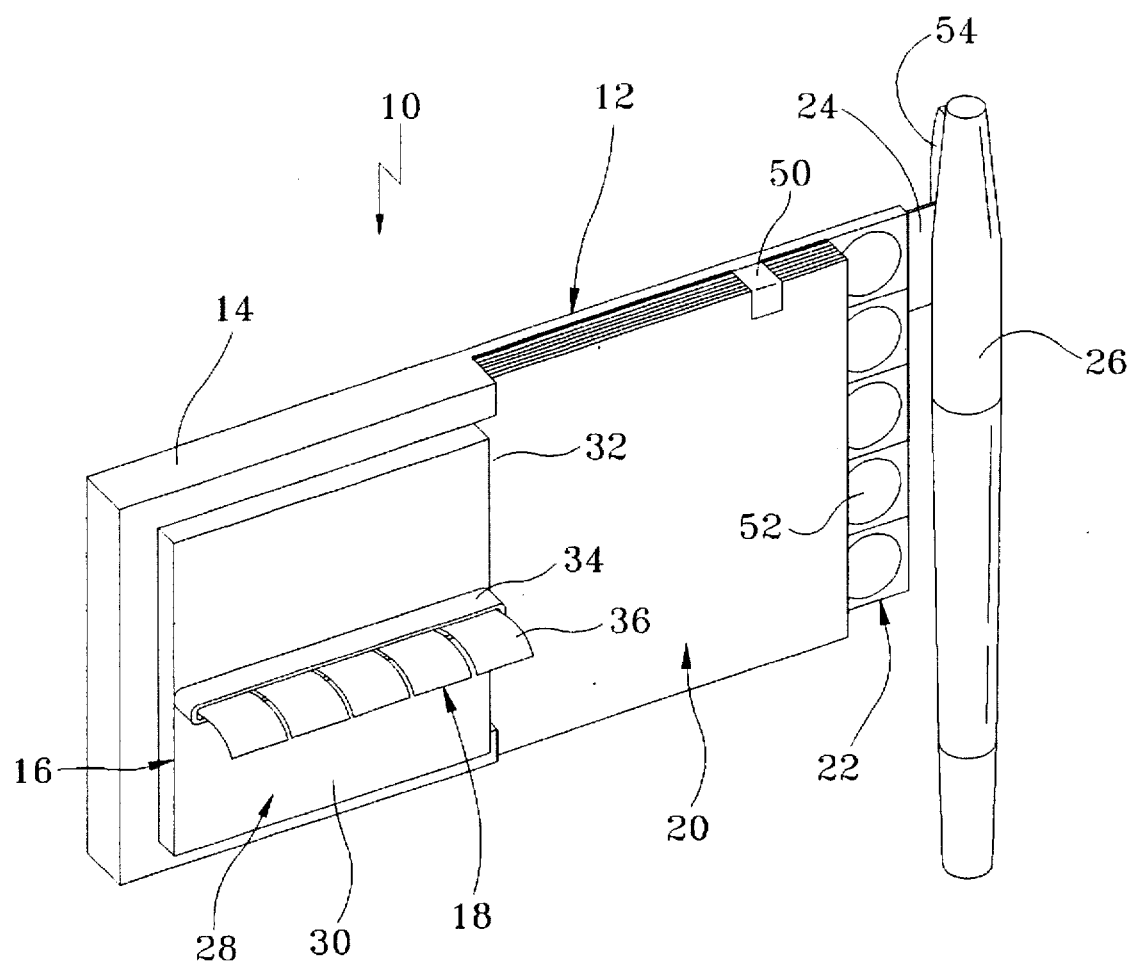
FIG. 1 is a perspective view of the record keeping holder.
Figure 2:
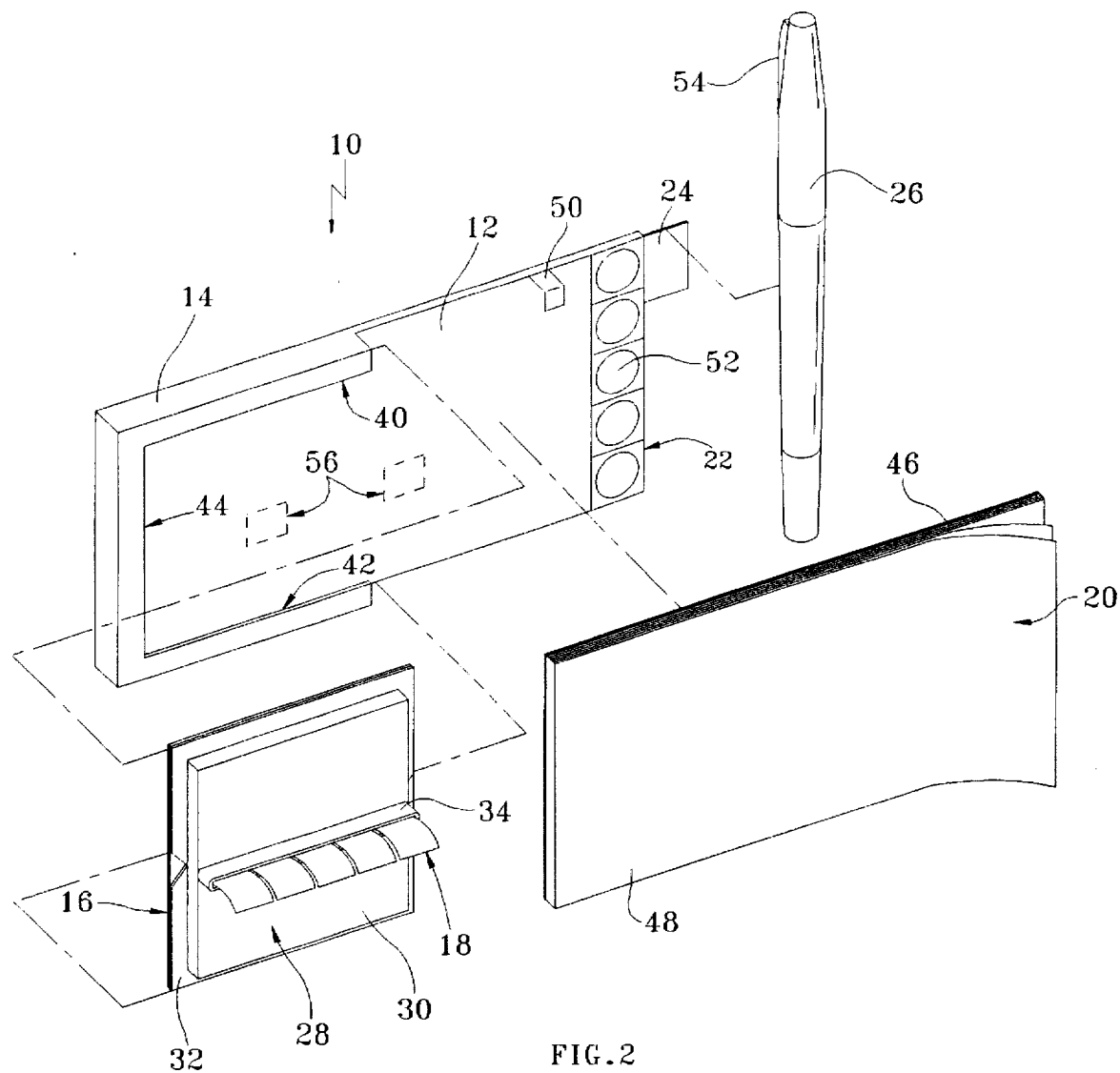
FIG. 2 is an exploded perspective view of the record keeping holder.

One embodiment of the record keeping holder, designated generally 10, is illustrated in FIGS. 1 and 2. The holder 10 includes a base 12 having a dispenser holding means 14, such as a substantially C-shaped bracket integrally formed with the base 12 as shown in FIGS. 1 and 2, that is operative for receiving and positioning at least one tape flag dispenser 16, containing a supply of tape flags 18 of contrasting colors that can be individually dispensed from the dispenser 16 as needed. The holder 10 further comprises a writing surface 20, such as a note pad, a color coded member 22, a writing instrument holder 24 attached to the base 12, and writing instrument 26, such as an ink pen, removably received by the writing instrument holder 24.

Figure 3:
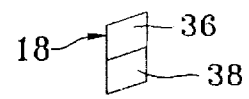
FIG. 3 is a perspective view of a tape flag.

The dispenser 16 preferably comprises a commercially available tape flag dispenser, such as a dispenser containing a supply of "Smaller Size" POST-IT (3M Corporation ™) tape flags of the type manufactured and marketed by the 3M Corporation of Saint Paul, Minn. The dispenser 16 comprises a container portion 28 having a substantially square plastic shell comprising an enlarged body portion 30 with an outwardly projecting lower flange 32 and an upwardly extending open ended tubular neck portion 34. The neck portion 34 extends integrally upward from the body portion 30 and it has a cross sectional length that corresponds to the combined width of the tape flags 18. As shown in FIG. 3, each tape flag 18 is comprised of a colored flag portion 36 and an adhesive portion 38. A supply of tape flags 18 of contrasting colors is contained in the body portion 30 such that each time a tape flag 18 is pulled through the neck portion 34 a new tape flag 18 of the same color is advanced into a dispensing position wherein the colored flag portion 36 projects outwardly from the neck portion 34.

The base 12 and C-shaped bracket 14 may be integrally molded from any one of a number of suitable relatively light weight polymer materials. Alternatively, the base 12 and C-shaped bracket 14 may be composed of any other suitable material such as rubber, metal or other material without departing from the spirit or scope of this invention. In conjunction with the base 12, the C-shaped bracket 14 forms a pair of longitudinal channels 40 and 42 and a single vertical channel 44.

The writing surface 20 is comprised of a substantially rigid backing material 46, such as cardboard or the like, and a plurality of sheets of paper 48 bound together to form a writing surface 20, such as a standard 3" by 5" note pad, capable of receiving markings from a writing instrument 26, such as an ink pen. One end of the writing surface 20 is received into and slid along channels 40 and 42 until it abuts the vertical portion of the C-shaped bracket 14 that forms channel 44. The tape flag dispenser 16 is removably held in place by sliding the lower flange 32 into channels 40 and 42 between the C-shaped bracket 14 and the writing surface 20 until it abuts the vertical portion of the C-shaped bracket 14 that forms channel 44. The writing surface 20 is held in place by the placement of the tape flag dispenser 16 into the C-shaped bracket 14. A clip member 50 is placed over the writing surface 20 to hold the sheets of paper 48 in place.

A color coded member 22 having a plurality of color indicators 52 corresponding in number to the number of tape flag 18 colors is formed integrally with the base 12 substantially adjacent to the writing surface 20. The selection of colors for the color indicators 52 should substantially correspond to the colors used for the colored flag portions 36 of tape flags 18. The writing instrument holder 24 extends longitudinally from the base 12 and is suitable for removably receiving a writing instrument 26. The writing instrument holder 24 supports the pen clip 54 of the writing instrument 26. In its preferred embodiment, the base 12 is adapted to be supported on a metallic vertical surface, such as a refrigerator or freezer door or wall, by utilizing one or more magnets 56 on the back of base 12.

In use, the holder 10 will be placed on a refrigerator or freezer door where it will be visible to persons opening the food storage unit. Typically, left-over or pre-prepared food items are enclosed in a package or container for storage in the food storage unit. The person storing the food item will remove a tape flag 18 from the dispenser 16 and place it on the food item package or container so that the colored flag portion 36 is visible. The person then would write down a brief description of the food item, including what it is and when it was being first stored or the last date for eating the food item, on the writing surface 20 adjacent to the color indicators 52 that corresponds to the color of the colored flag portion 36 of the tape flag 18 that was placed on the food item package or container.

When a person is looking for what foods are available in the refrigerator or freezer for consumption, he or she can review the list on the writing surface 20, identify the color of the tape flag 18 that corresponds to the desired food item and then locate that food item in the refrigerator or freezer by locating the corresponding colored flag portion 36 on the food item package or container. After the available space on the top paper 48 on the writing surface 20 is filled, the top paper 48 can be removed and a new list started. When all available tape flags 18 are used and the dispenser 16 is empty or the writing surface 20 no longer has paper 48, either or both the dispenser 16 or the writing surface 20 can be slid out of the C-shaped bracket 14 and replaced with another commercially available dispenser 16 or writing surface 20.

Alternative embodiments include the use of a C-shaped bracket 14 or a color coded member 22, or both, that are separate units fixedly attached to the base 12 with adhesive material or by any other suitable manner. Alternatively, instead of the C-shaped bracket 14, the record keeping holder 10 can utilize a substantially U-shaped bracket and a modified means for securing the writing surface 20 to the base 12, such as an adhesive, a hook and loop material, or a slot in the base 12 sized appropriately to removably receive the backing material 46. Yet another alternative is for the record keeping holder 10 to utilize two substantially parallel longitudinally extending channel members properly spaced apart to frictionally receive the lower flange 32 and removably hold the tape flag dispenser 16 on the base 12. In the various Figures, the writing instrument holder 24 is shown as a small extension from the base 12. Alternatively, the writing instrument holder 24 could be a tray, pouch or any other member suitable for holding and allowing easy access to a writing instrument 26.

Figure 4:
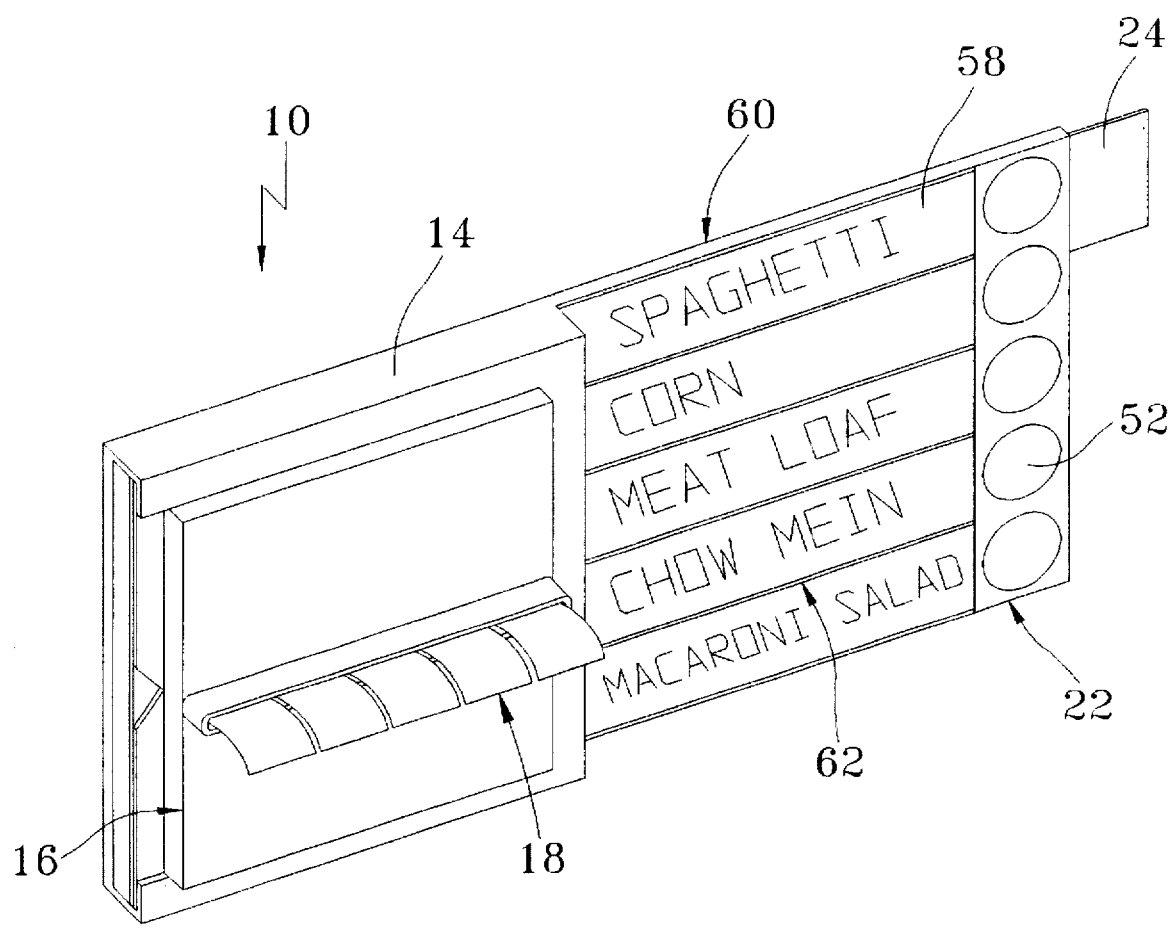
FIG. 4 is a perspective view of another embodiment of the record keeping holder showing the use of blank or pre-printed cards for summarizing the stored food item.

Another embodiment of the record keeping holder is shown in FIG. 4. In this embodiment, the dispenser 16 is held in place by a reverse facing C-shaped bracket 14. The writing surface in this embodiment is a plurality of cards 58 that are secured in place by a card holder 60 having a plurality of slots 62 suitable for securing a card 58 adjacent to a color indicator 52. The holder 10 can be supplied with cards 58 that are blank to permit the user to write a brief description of the food item and a supply of cards 58 that are pre-printed with descriptions of commonly used food items, as shown in FIG. 4. In use, the user places a tape flag 18 on the food item container, chooses a pre-printed card 58 that describes the food or a blank card 58 that can be customized with the user's own description and then places the card 58 into the slot 62 adjacent the color indicator 52 that corresponds to the color of the tape flag 18 placed on the food item container. The cards 58 can be stored in any suitable manner that facilitates quick and easy retrieval for reuse.

Figure 5:
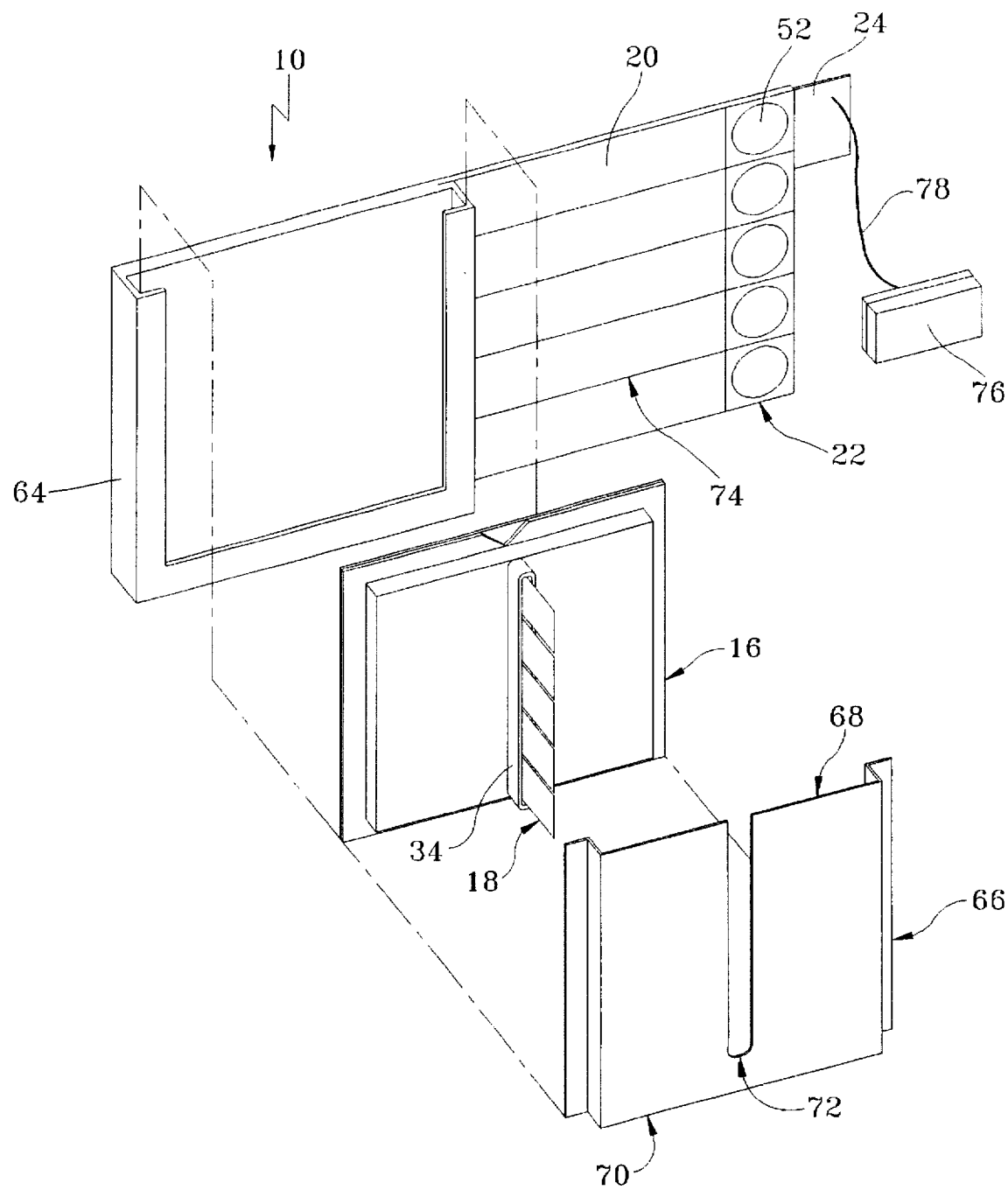
FIG. 5 is an exploded perspective view of another embodiment of the record keeping holder showing the use of a U-shaped bracket, a decorative cover, a lined, non-porous writing surface, and a flexible cord having an eraser attached at one end.

Yet another embodiment of the record keeping holder is shown in FIG. 5. In this embodiment, the dispenser 16 is held in place by a substantially U-shaped bracket 64. A dispenser cover 66 is used to improve the visual appearance of the holder 10. In this embodiment, the dispenser cover 66 has a first end 68, a second end 70 and an elongated longitudinally extending channel 72. The first end 68 is open, of suitable width to removably receive the dispenser 16, and in communication with the channel 72. The second end 70 is closed. The cover 66 can be manufactured of the same or similar material as the base 12 and can be colored to fit in to a pre-existing kitchen decor. In use, the cover 66 is slid into the U-shaped bracket 64 and then the dispenser 16 is slid between the cover 66 and the base 12 such that the neck portion 34 is received into the channel 72 and the tape flags 18 extend outwardly from the cover 66. Alternatively, the cover 66 can have both the first end 68 and the second end 70 closed and the channel 72 only of sufficient length to receive the neck portion 34. In this embodiment, the cover 66 would be placed over the dispenser 16 with the neck portion passing through and extending beyond the channel 72 prior to placement of the dispenser 16 and cover 66 into the U-shaped bracket 64. The cover 66 can also be utilized in the embodiment illustrated in FIGS. 1 and 2 by receiving the cover 66 into the C-shaped bracket 14.

In the embodiment shown by FIG. 5, the writing surface 20 is a substantially non-porous, erasable surface made from a melamine or chalk board material, or the like, that is secured to the base 12 by the use of a suitable adhesive, such as a glue-like substance. The color coded member 22 is attached to the holder 10 substantially adjacent to the writing surface 20. The writing surface 20 can be supplied with horizontal lines 74 that provide writing spaces corresponding to the color indicators 52 on the color coded member 22. The writing instrument 26 can be of the dry erasable ink type suitable for erasably writing on the writing surface 20. An eraser 76 can be supplied with the holder 10 to facilitate erasing messages off the writing surface 20. The eraser 76 can be attached to the holder 10 at various places, including the writing instrument holder 24, with a flexible cord member 78.

Figure 6:
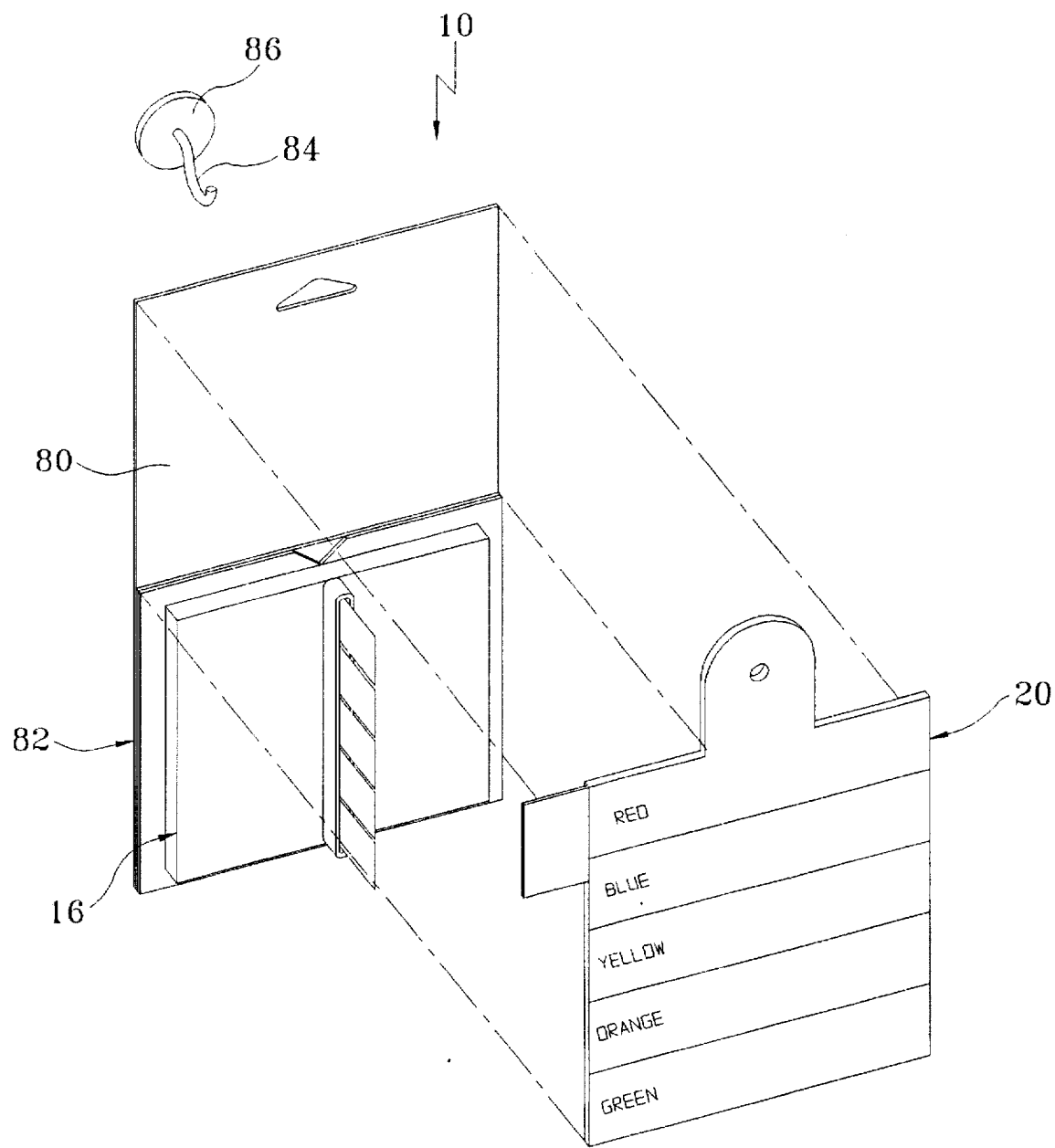
FIG. 6 is an exploded perspective view of another embodiment of the record keeping holder showing the use of the tape flag packaging as the base.

Another embodiment of the present invention is illustrated in FIG. 6. In this embodiment, the display card 80, such as that which is typically sold with the dispenser 16, is utilized as the base 12 for the holder 10. The display card 80 is attached at one end to a back portion 82 on the back of the dispenser 16. The writing surface 20 is secured to the display card 80 by the use of any suitable adhesive, such as a glue-like substance. In this embodiment, the writing surface 20 can be made of any material that is suitable for multiple use marking and erasing, such as commercially available thin sheet melamine paper of the dry-erase type. The record keeping holder 10 can be supported on a metallic vertical surface by the use of a hook 84 attached to a magnet 86, as shown in FIG. 6.

Figure 7:
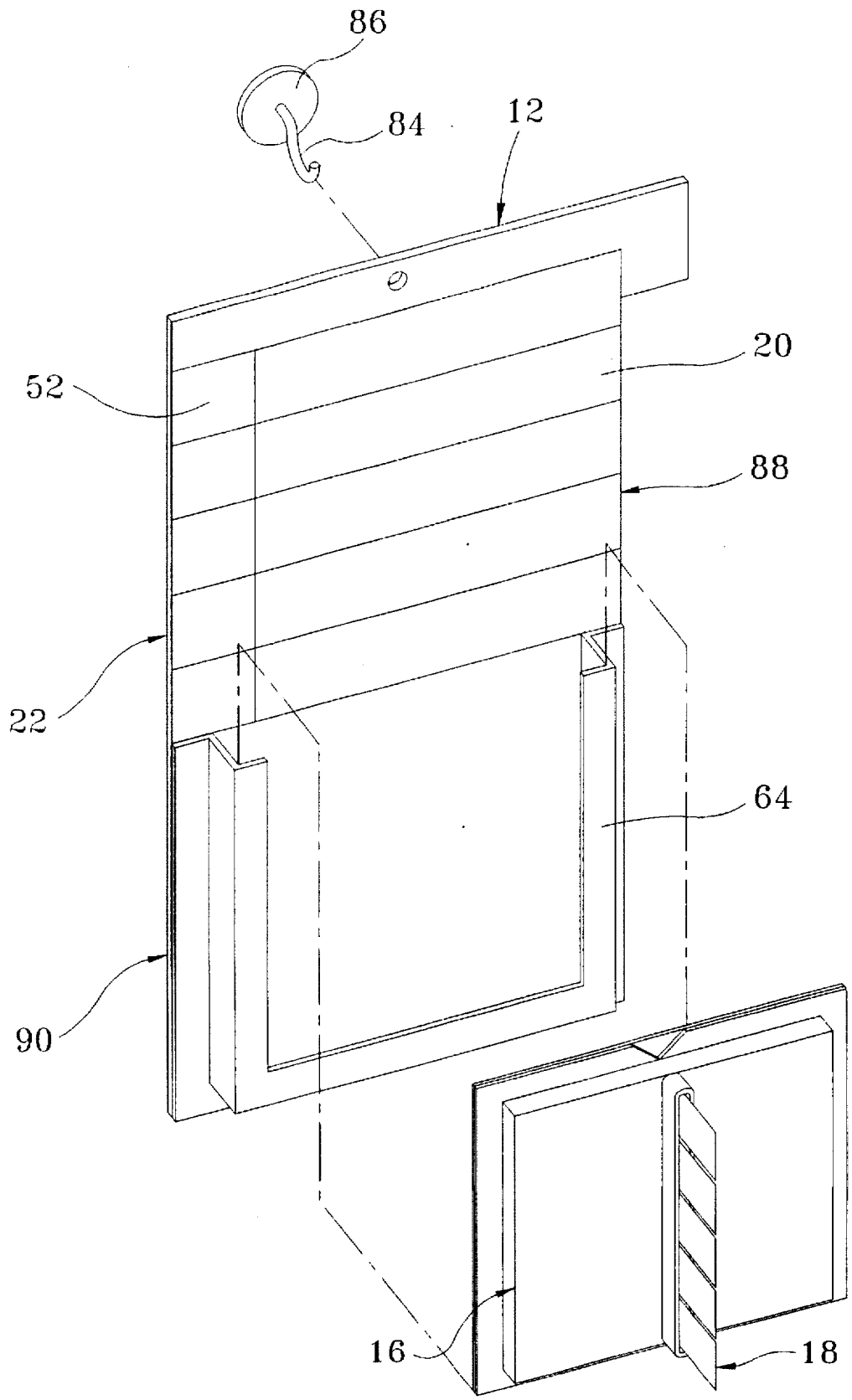
FIG. 7 is a front view of another embodiment of the record keeping holder showing the use of the writing surface as the base.

Another embodiment of the present invention is illustrated in FIG. 7. In this embodiment, the base 12 has an upper portion 88 and a lower portion 90. Attached to or integral with the upper portion is a writing surface 20, which can be made of any material that is suitable for multiple use marking and erasing, such as commercially available dry erasable melamine board or paper. A color coded member 22 having a plurality of color indicators 52 is attached to or integral with the writing surface 20. The U-shaped bracket 64 of this embodiment is adaptable for attachment to the base 12 and for receiving dispenser 16. A magnet 86 having a hook 84 can be used to support the holder 10 on a metallic vertical surface.

While there is shown and described herein certain specific alternative forms of the invention, it will be readily apparent to those skilled in the art that the invention is not so limited, but is susceptible to various modifications and rearrangements in design and materials without departing from the spirit and scope of the invention.

What is claimed is:

1. A record keeping holder, comprising:
   a base;
   dispenser holding means for removably holding at least one dispenser for tape flags on said base, said dispenser containing a supply of tape flags of a plurality of flag colors;
   a writing surface;
   securing means for securing said writing surface to said base; and a color coded member attached to said base substantially adjacent to said writing surface, said color coded member having a plurality of color indicators corresponding to said plurality of flag colors.

2. A record keeping holder according to claim 1, wherein said dispenser further comprises a container portion having an enlarged body portion and an outwardly projecting lower flange and an upwardly extending open ended tubular neck portion of elongated cross sectional length and reduced cross sectional width on said body portion and a back portion enclosing said body portion, said supply of tape flags being dispensable from said body portion through said neck portion.

3. A record keeping holder according to claim 1, wherein said record keeping holder further comprises a writing instrument holder attached to said base and a writing instrument removably received by said writing instrument holder.

4. A record keeping holder according to claim 1, wherein said dispenser holding means comprises a substantially U-shaped bracket.

5. A record keeping holder according to claim 1, wherein said record keeping holder further comprises a dispenser cover substantially covering said dispenser.

6. A record keeping holder according to claim 1, wherein said record keeping holder further comprises support means for releasably supporting said base on a vertical surface.

7. A record keeping holder according to claim 6, wherein said support means comprises at least one magnet fixedly attached to said base.

8. A record keeping holder according to claim 1, wherein said writing surface is a substantially non-porous material and said securing means comprises an adhesive material.

9. A record keeping holder according to claim 8, wherein said record keeping holder further comprises a writing instrument holder attached to said base and a writing instrument removably received by said writing instrument holder, wherein said writing instrument is capable of producing erasable markings on said substantially non-porous material.

10. A record keeping holder according to claim 8, wherein said record keeping holder further comprises an eraser and a flexible cord member, wherein said cord member is fixedly attached to and interconnects said holder and said eraser member.

* * * * *